May 31, 1949.   W. S. BROFFITT ET AL   2,471,719
AUTOMATIC WELDER'S HOOD CONTROL
Filed Jan. 19, 1946
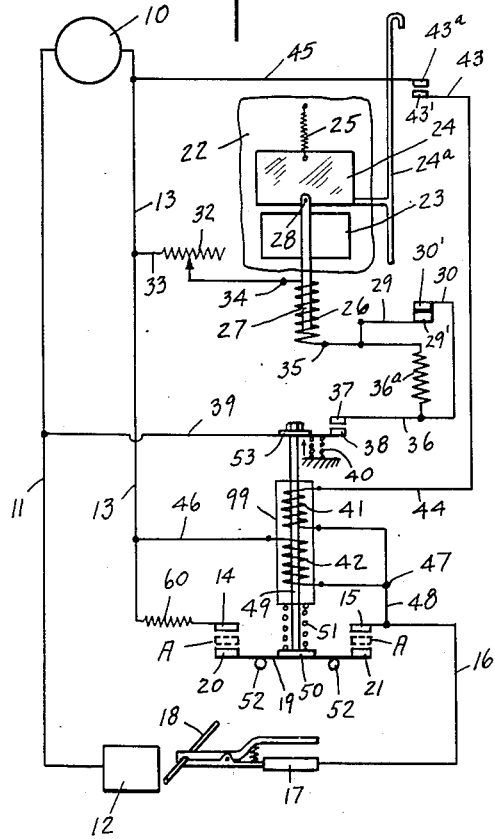
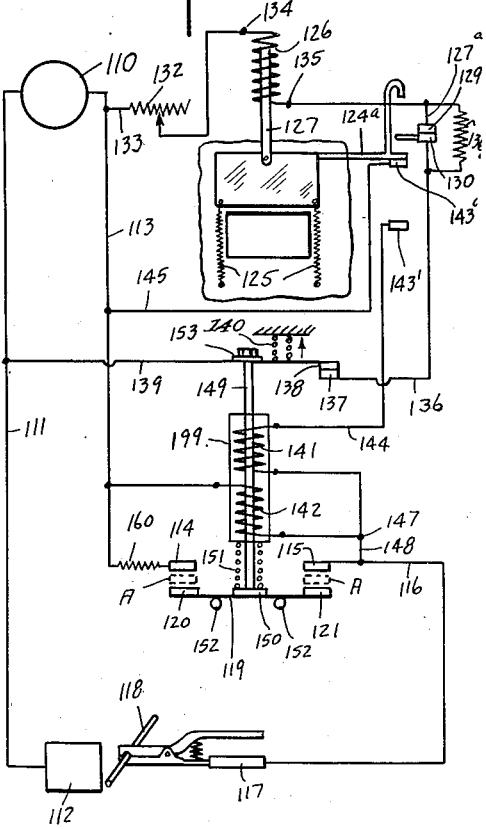
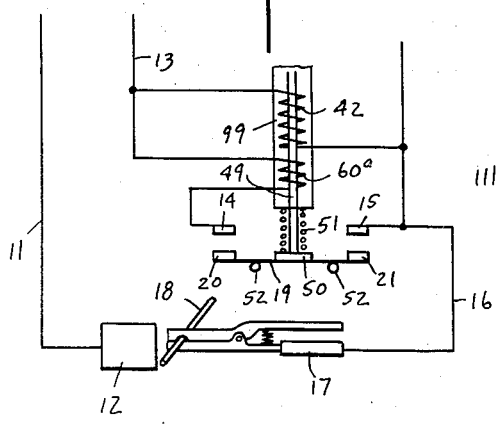
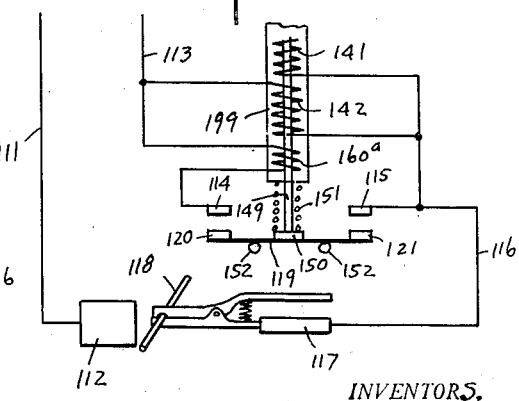
INVENTORS.
WILGUS S. BROFFITT.
HOMER F. MONTAGUE.
BY
Lockwood, Goldsmith & Galt
ATTORNEYS.

Patented May 31, 1949

2,471,719

UNITED STATES PATENT OFFICE 2,471,719

AUTOMATIC WELDER'S HOOD CONTROL

Wilgus S. Broffitt, Indianapolis, Ind., and
Homer F. Montague, Lexington, Ky.

Application January 19, 1946, Serial No. 642,190

1 Claim. (Cl. 2—8)

This invention relates to welding apparatus including the welding device, a protective helmet and circuit means operatively connecting same together.

Heretofore in the art such a helmet was controlled by voltage variation and hence when the character of the work was varied, the helmet was controlled in a manner such that protection was eliminated or the helmet was so controlled that intermittent shutter action occurred, which was most disconcerting and objectionable in practice. Other forms of such apparatus had other well known objections, for example, the use of two independent sources of energy, among others.

The chief object of the present invention is to provide in such apparatus a control that avoids all the known objectionable features or imperfections of the prior art structures and retains all the advantages thereof.

The chief feature of the present invention resides in the circuit control of a movable protective element in a helmet and the electrode including welding circuit.

Other objects and features of the invention will be set forth more fully hereinafter.

The full nature of the invention will be understood from the accompanying drawings and the following description and claim:

In the drawings

Fig. 1 is a schematic diagram of a welding apparatus embodying the invention and that form wherein the helmet shutter or shield is electrically closed and is normally constrained to open position.

Fig. 2 is a schematic diagram of that portion of the apparatus wherein the helmet shutter or shield is electrically opened and is normally constrained to closed position, in other words, the reverse of the form diagrammatically illustrated in Fig. 1.

Fig. 1—A is a schematic diagram of a modification of a portion of the system illustrated in Fig. 1.

Fig. 2—A is a similar view of a similar modification of the form illustrated in Fig. 2.

In Fig. 1 of the drawings 10 indicates a single source of energy having the required or desired capacity. It is connected by line 11 to the work or ground 12. The source 10 is connected by line 13 to contact 14, preferably through resistance 60. An adjacent contact 15 is connected by line 16 to electrode holder 17 including electrode or welding rod 18. The holder may be of any suitable type. A bridging bar 19, with contacts 20 and 21, is provided to complete the welding circuit when contacts 14—20 and 15—21 are in engagement.

This is one switch arrangement. Other types may be substituted, provided that between normally open and normally closed positions the said movable switch element is capable of intermediate positioning without closing, by substantially short-circuiting, the welding circuit across the switch and the purpose hereof will appear hereinafter.

In said Fig. 1, 22 indicates diagrammatically a portion of an operator's helmet having opening 23 therein. A protective lens, shield or shutter 24 of the conventional type is juxtapositioned thereto and is movable alternately to expose said opening and close the same. When closed, the operator may look at the arc without eye strain and injury and obviously without spark burning should the material and/or rod spark or spatter.

In Fig. 1 the lens is normally constrained to open position by spring means 25 or the like and is moved to closed position by electrically operated means, herein diagrammatically illustrated as a solenoid 26 with core 27, the latter being connected at 28 to the lens.

Juxtapositioned to the opening 23 or associated with core 27 is a switch member 29 adjacent switch member 30 having prime designated contacts. When the shield is in closed position a protective circuit (see resistance 36a) for solenoid 26 is conditioned by opening the contacts 29'—30' as by the shutter or extension 24a thereof dropping upon member 29 and forcing contact 29' out of engagement with contact 30'. Note this switch is not opened until the helmet opening is fully closed or shielded.

Line 33 from line 13 connects to one terminal 34 of solenoid 26 through resistance 32. The other terminal 35 is connected through resistance 36a to one contact 37 of (see Fig. 1) a normally open switch having contact 38 connected by line 39 to line 11. Until switch 37—38 is closed the solenoid 26 can not be energized and the shield can not close the helmet opening. The weight of core 49 and main welding circuit contacts plus the force of spring 51 normally holds switch member 38 depressed even though spring 40 tends to force contact 38 to engage contact 37. When the core is elevated the hold down 53 is elevated. Then and only then can spring 40 close switch 37—38.

A multiple section solenoid 99 includes at least two sections 41 and 42, the former having one terminal connected by line 44 to switch member 43 and contact 43′ The other section has one terminal connected by line 46 to line 13. The other two terminals are connected together at 47 and by line 48 to line 16. Line 45 connects contact 43a to line 13.

Within solenoid 99 is the elongated core 49 insulatably connected at 50 to bridging bar 19. Spring 51 normally constrains same against stops 52. Core 49 is insulatably connected by member 53 to switch member 38. This connection may be adjustable if desired.

Operation

The parts in Fig. 1 are all illustrated in the so-called inoperative position. When welding is to be effected, the rod 18 is touched to work 12. This closes a high resistance circuit from source 10 and line 13 through line 46, coil 42 and line 48 to line 16, thus shunting the main switch 19. Being a high resistance circuit only a small spark can be drawn. However, this circuit energizes solenoid 42 so that bridging bar 19 is elevated with and by the core 49 to the intermediate open position, see A—A.

This movement is sufficient so that switch member 38 by means of spring 40 engages contact 37. Upon this engagement solenoid 26 is energized and the shield is moved to closed position in opposition to spring means 25. When the shield is in fully closed position, switch 29′—30′ is opened by arm 24a for resistance 36a to protect solenoid 26. The other coil 41 is then energized through lines 44—45 and switch 43a—43′ as by the same member 24a but by the other end thereof.

Since now both coils 41 and 42 are energized, the dual solenoid 99 is completely energized and only then is main switch 19 fully closed, thereby establishing the complete welding circuit which will be maintained as long as the shutter 24 is in closed position and while switches 37—38 and 14—20 and 15—21 are closed. Closing of the two latter switches does not short out solenoid 99 because of resistance 60 in line 13.

Obviously, when the arc is lost, broken, drawn or blown out, all solenoids are de-energized and spring means 25 returns to the lens 24 to open position. The cycle is then repeated by touching the work, etc. Should the shield open, switch 43′—43a will open and just prior to the shield exposing any part of the opening, thus de-energizing coil 41, whereupon the welding circuit switch 19—20—21 drops to the dotted line open position A—A, even though coil 42 remains energized and the welding circuit will be opened.

Reference will now be had to Fig. 2 wherein the reverse form is illustrated. Herein 100 numerals indicate like or comparable parts. Herein springs 125 close the lens whenever solenoid 126 is de-energized, which occurs when normally closed switch 137—138 is opened which is when the electrode touches the work to energize coil 142 only. The welding circuit is only closed when coil 141 also is energized by switch 143′—143a being closed.

One disadvantage of this type is solenoid 126 is always energized when no work is being done. With Fig. 1 type the solenoid 26 is only energized when the electrode is grounded. However, this Fig. 2 form has the advantage that if the control current fails the shield is normally held closed or in eye protecting position. As before stated, both forms function similarly except as to springs 40 and 140 which operate reversely since the respective switches are reversed.

The numerals utilized in Figs. 1 and 2 are used in Figs. 1A and 2A respectively. These circuits differ in that, instead of resistance 60 or 160 respectively being employed, line 13 or 113 includes a series resistance 60a or 160a respectively in the form of a coil making structure 99 and 199 triple in character.

The operation of the form illustrated in Fig. 1—A is identical to that for Fig. 1 and in Fig. 2—A is identical to that for Fig. 2.

While the invention has been illustrated and described in great detail in the drawings and foregoing description, the same is to be considered as illustrative and not restrictive in character.

The several modifications described herein, as well as others which will readily suggest themselves to persons skilled in this art, all are considered to be within the broad scope of the invention, reference being had to the appended claim.

The invention claimed is:

In a welding apparatus having a welding circuit switch normally constrained to open position and a helmet having an opening protectable by a shield movable into and out of registration with the opening, movement in one direction being electrically controlled, the combination of electrically operable means for effecting such control, switch means for controlling such electrically operable means, electrically operable multiple means for closing the welding circuit switch, one of the multiple means being connected in shunt across the last mentioned switch and always energized when the work is electrode engaged, another switch means normally open and being closed only when the shield is fully registered with the opening and being in series with another of the electrically operable multiple means for energization thereof, total multiple means energization only effecting closing of the welding circuit switch, and partial energization of the electrically operable multiple means effecting the operation of the electrically operable means switch means when the work is electrode engaged.

WILGUS S. BROFFITT.
H. F. MONTAGUE.

REFERENCES CITED

The following references are of record in the file of this patent:

UNITED STATES PATENTS

| Number | Name | Date |
|---|---|---|
| 2,036,224 | Lincoln et al. | Apr. 7, 1936 |
| 2,384,517 | Zimmerman et al. | Sept. 11, 1945 |